United States Patent
Arndt

[11] 3,842,419
[45] Oct. 15, 1974

[54] PASSIVE RANGING INTERFEROMETER SYSTEM

[75] Inventor: Walter R. Arndt, Wantagh, N.Y.

[73] Assignee: The United States of America as represented by the Secretary of the Navy, Washington, D.C.

[22] Filed: Aug. 8, 1972

[21] Appl. No.: 280,008

[52] U.S. Cl. ..................... 343/112 D, 235/150.27
[51] Int. Cl. ............................................. G01s 5/14
[58] Field of Search ............ 343/112 D; 235/150.27

[56] References Cited
FOREIGN PATENTS OR APPLICATIONS
1,041,589   9/1966   Great Britain .................. 343/112 D

*Primary Examiner*—Maynard R. Wilbur
*Assistant Examiner*—Richard E. Berger
*Attorney, Agent, or Firm*—R. S. Sciascia; Q. E. Hodges

[57] ABSTRACT

Two triad antennas are arranged orthogonally. Signals emitted a distance R from the antennas generate phase related signals in the triad antenna systems. The distance R of the emitter form the antenna is functionally related to the phase difference of the received signals. A D.C. analog voltage proportional to the phase difference is produced and the distance of the emitter from the antenna systems is measured with relation to this analog voltage.

Hybrids and couplers connected to the antenna are switched by a logic system so that discontinuities in their phase shift/voltage transfer characteristics, produced by angular displacement of the source about the antenna center, are eliminated and a signal related only to the distance R is obtained.

11 Claims, 13 Drawing Figures

PASSIVE RANGING INTERFEROMETER SYSTEM

SUMMARY OF THE INVENTION

This invention relates to an apparatus and method of passive ranging. It utilizes a cross-based radio interferometer which measures the range R of an emitter by measuring the emitted wave curvature as a phase shift time difference of the received signal at each element of the antenna system.

The antenna comprises two triads sharing a common center element. The traids are arranged at right angles or orthogonally. An emmitter at a range R from the center antenna element and removed from each of the other triad elements, by discrete distances causes phase related signals to be generated in each of the antenna's elements.

The phase related signals are processed through hybrids and couplers to produce a D.C. analog voltage proportional to the phase difference of the received signals and the distance R.

The signals, as received in each triad, are functionally related to the angular displacement of the emitter from boresight of the antenna system. This method of passive ranging electronically processes the phase related signals in a novel manner so that the effect of the angular displacement on the output is cancelled and a D.C. analog output voltage is produced which is related solely to the distance R of the emitter from the center of the antenna and to the distance between each of the two outboard antennas and the center antenna. The range ambiguity introduced by emitter angular displacement off the antenna boresight is eliminated by utilizing two triad antennas on orthogonal base lines so that the output of one of the triads varies as a function of the off angle and the orthogonally related triad output varies as the complement of the off angle. The resultant output of the two signals summed together is then the sum of the sine square and the cosine square of the off angle, totalling to unity (1) and cancelling out the angular ambiguity.

The new result produced by this invention is the capability of passively and secretly measuring the distance R of an antenna from an emitter whereby the distance measurement is made independent of the angle of the emitter from the antenna system. In addition, this system is capable of 360° of azimuth coverage; it is insensitive to the angle of signal arrival and therefore capable of measuring distance despite "tilting" of the wavelength caused by propagation abnormalities.

Applications of this invention are passive ground ranging of aircraft using communication frequencies in the VHF and UHF bands, and secret ground ranging of enemy aircraft targets.

It is therefore an object of this invention to provide a system for passive ranging of an emitter.

It is a second object of this invention to be capable of passive ranging of an emitter independent of the azimuth angle of the emitter.

DESCRIPTION OF THE PREFERRED EMBODIMENT

Figure 1:
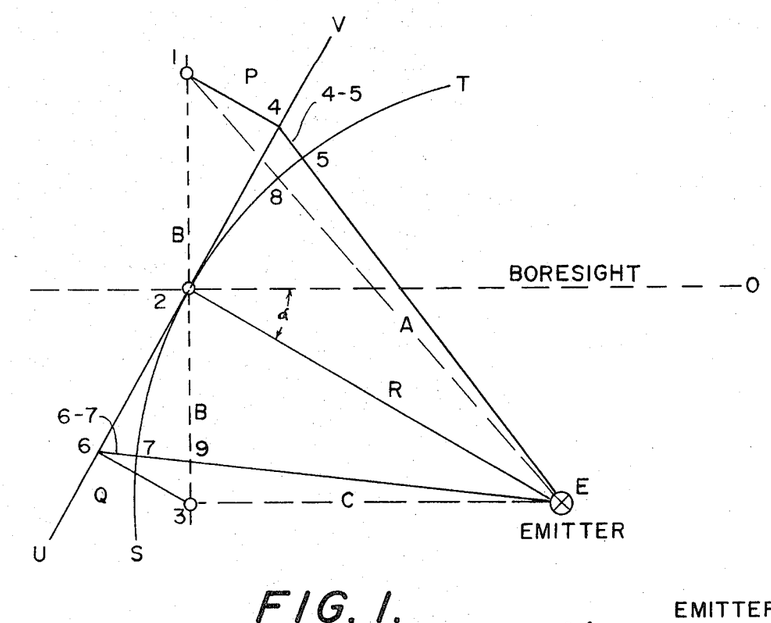
FIG. 1 is a schematic representation of a wave front crossing an antenna triad system and is used in conjunction with FIG. 2 to explain the phase related signal relationship produced in the antenna array.

The basic geometry for passively measuring the range of an emitter is shown in FIG. 1. 2 is the center antenna of a triad antenna comprising three in line antennas, 1, 2, and 3. Antennas 1 and 2 and 2 and 3 are separated by equal distances B. Emitter E is at a true range R from center antenna 2 and displaced from the boresight or perpendicular bisector O of the antenna triad by the off angle $\alpha$. A wave front curvature is shown by curve line S-T impinging upon center antenna 2, having passed through antenna 3 but not yet having arrived at antenna 1. The emitter E is at a distance A from antenna 1 and a distance C from antenna 3. The differences in path length between the outside paths A and C and the true range R, are P and Q respectively. When the formulas for the path length differences are derived in the form of infinite series, the following equations are obtained, mathematically representing the phase related signals produced in each of the outboard antennas 1 and 3

$A = R + B \sin\alpha + B^2/2R (1 - \sin^2\alpha) - B^3 \sin\alpha/2R^2 (1 - \sin^2\alpha) + (1)$ $C = R - B \sin\alpha + B^2/2R (1 - \sin^2\alpha) + B^3 \sin\alpha/2R^2 (1 - \sin^2\alpha) - (2)$ The phase related signal received at center antenna 2 is indicative of the true distance R to the emitter. Equations for the path length differences, P and Q, are obtained by subtracting the signal indicative of R from equations (1) and (2) representing the phase related signals at antennas 1 and 3, since $P = A - R$ and $Q = C - R$. Two new phase related signals are produced represented by the following mathematical relationships $P = +B \sin\alpha + B^2/2R (1 - \sin^2\alpha) - B^3\sin\alpha/2R^2 (1 - \sin^2\alpha) - $ (3)

$Q = -B \sin\alpha + B^2/2R (1 - \sin^2\alpha) + B^3\sin\alpha/2R^2 (1 - \sin^2\alpha) + $ (4)

The first terms of equations (3) and (4), ($+B \sin\alpha$) and ($-B \sin\alpha$), represent the distances from the outside antennas 1 and 3 perpendicular to a line UV representing the wavefront as if it were plane wave rather than spherical wave. These are lines 1–4 and 3–6 in FIG. 1. The second terms of equations (3) and (4), $+B^2/2R (1 - \sin^2\alpha)$ represent the distances from the assumed plane wave front U–V to the actual curve wave front S–T at the points where the $+B \sin\alpha$ and $-B \sin\alpha$ distances intercept the plane wave front. These are lines 4–5 and 6–7 in FIG. 1. These terms, $+B^2/2R (1 - \sin^2\alpha)$, are wave front curvature terms. As shown in FIG. 1, and equations (3) and (4), the B sin$\alpha$ term must be added to the true range R to obtain the outer path length A. B sin$\alpha$ must be subtracted from the true range R to obtain the outer path length C. The wave front curvature terms are positive quantities and must be added algebraically to the true range R to obtain either of the outer path lengths A or C.

Note that the first terms ($+B \sin\alpha$) and ($-B \sin\alpha$) are functions of the baseline length B between each pair of adjoining antennas arranged on a baseline and the emitter angle off the boresight O. The wave front curvature terms are, however, seen to be dependent on the baseline squared ($B^2$), the true range R to the target and the emitter angle $\alpha$ off the boresight O.

The signals from the outputs of the three antennas are combined in phase addition so the B sin$\alpha$ terms of the equations electrically cancel out leaving a final output D represented by the following equation herein the higher order terms are insignificant relative to the $B^2/2R$ term and are dropped.

$D = B^2/R (1 - \sin^2\alpha)$ (5)

Equation (5) is the algebraic sum of two path length differences P and Q and represents twice the value of the curvature terms in equations (3) and (4). This term is ambiguous with respect to range R and off boresight angle $\alpha$, since the output signal D is a function of both range R and the off angle $\alpha$.

Figures 2, 7:
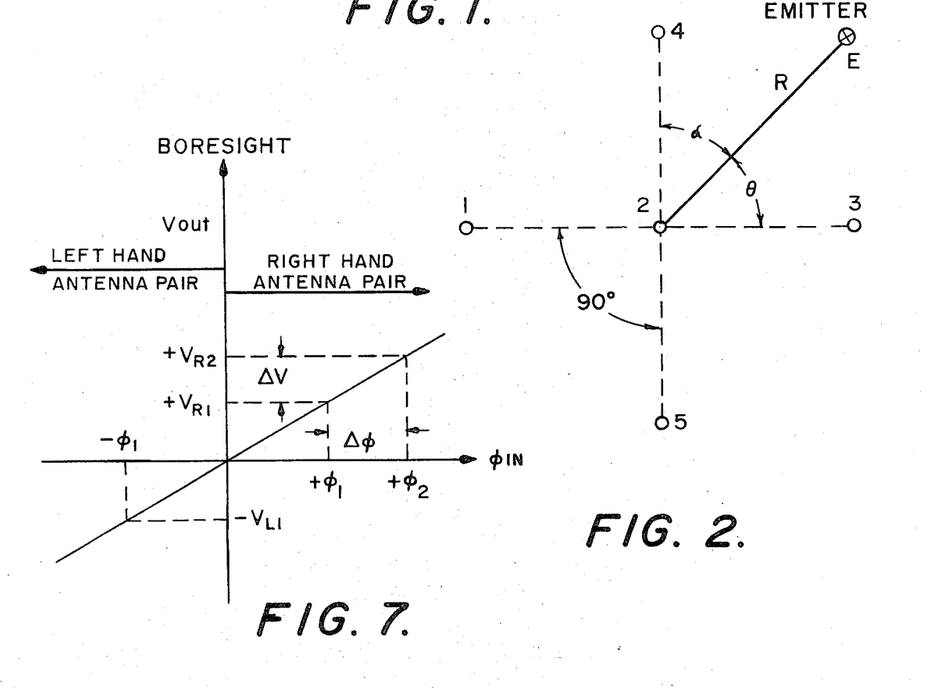
FIG. 2 shows two triad antenna systems arranged on orthogonal baselines and whereby the angular ambiguity introduced by a single triad system is resolved.
FIG. 7 is a single phase/voltage transfer characteristic showing how the equal and opposite phase related components are electrically cancelled leaving a D.C. signal proportional to the phase differential.

To remove the angle $\alpha$ ambiguity, a second triad antenna is utilized and combined with the first triad on a baseline orthogonal to the baseline of the first triad, as shown in FIG. 2. Antenna triad 4-2-5 is orthogonal with respect to antenna triad 1-2-3 and both share center antenna 2. The output from antenna 1-2-3 varies as a function of angle $\alpha$ while the output of the second set antenna 4-2-5 varies as the angle complement $\theta$ of angle $\alpha$.

The signals from antenna 4-2-5 are combined as described with respect to antennas 1-2-3 and summed with the combined output of 1-2-3. The resulting output then represents a distance equal to the value of the first term in equation (5), ($B^2/R$) and is only dependent on $B^2$ and the true range R to the emitter.

The implementation of the process is described with reference to FIG. 2 showing antenna triad 1-2-3 in an orthogonal relationship with antenna triad 4-2-5 and with a signal received from the emitter at a distance R, from antenna 2.

The output of antenna 1 is $R + B \sin\alpha + B^2/2R (1 - \sin^2\alpha)$ (6)

and the output from antenna 3 is $R - B \sin\alpha + B^2/2R (1 - \sin^2\alpha)$ (7)

Similarly, the output from antenna 4 is $R - B \sin\theta + B^2/2R (1 - \sin^2\theta)$ (8)

and the output from antenna 5 is $R + B \sin\theta + B^2/2R (1 - \sin^2\theta)$ (9)

The output of antenna 2 is R, the distance to emitter E. The signal from antenna 2 is subtracted in phase from the phase related signals produced in antennas 1 and 3 and 4 and 5, producing four new phase related signals as follows:

$+B \sin\alpha + B^2/2R (1 - \sin^2\alpha)$ (Antenna 1 − Antenna 2) (10)

$-B \sin\alpha + B^2/2R (1 - \sin^2\alpha)$ (Antenna 3 − Antenna 2) (11)

$-B \sin\theta + B^2/2R (1 - \sin^2\theta)$ (Antenna 4 − Antenna 2) (12)

$+B \sin\theta + B^2/2R (1 - \sin^2\theta)$ (Antenna 5 − Antenna 2) (13)

Adding equations (10) and (11) produces a signal $B^2/R (1 - \sin^2\alpha) = B^2/R (\cos^2\alpha)$ (14)

from triad system 1-2-3; adding equations (12) and (13) produces a signal $B^2/R (1 - \sin^2\theta) = B^2/R \cos^2\theta = B^2/R \sin^2\alpha$ (15)

from triad system 4-2-5.

The phase related signals represented by equations (14) and (15) may now be combined in phase to produce a new signal, as shown in equation (16) below, $B^2/R = B^2/R \cos^2\alpha + B^2/R \sin^2\alpha = B^2/R (\cos^2\alpha + \sin^2\alpha)$ (16)

Since $\cos^2\alpha + \sin^2\alpha = 1$, this signal is independent of the angle.

The addition and subtraction of signals as described above with reference to FIG. 1 and FIG. 2 would be the addition and subtraction of phase related signals and may be accomplished by conventional hybrid and coupler junctions. The signal of equation (16), ($B^2/R$), would be a phase difference signal, inversely proportional to the true range R for a fixed baseline dimension B.

It is of considerable importance in this system that the output distance in terms of RF phase difference is less than one-half the input wave length for a considerable span of range R, at useful emitter frequencies and practical baseline lengths.

An example of the system capability where signal phase shift difference is used as a measure of range, and independent of emitter off-axis angle is given below.

Assume an emitter frequency of 10,000 MHz (X band), a baseline of 60 feet and an emitter 50 nautical miles away directly on the boresight of the 1-2-3 antenna triad with angle $\alpha$, as in FIG. 2, equal to zero. The plus and minus $B \sin\alpha$ terms, equations (3) and (4), are then equal to zero and the sum of the 1-2-3 antenna outputs is $$D = B^2/R (1 - \sin^2\alpha) = B^2/R \cos^2\alpha. \quad (17)$$

But since $\alpha = 0°$ for the given example: $\cos\alpha = 1$ and $D = B^2/R$.

For $B = 60$ ft. and $R = 50$ nm., the distance $D$ is equal to
$D = (60)^2/50 \approx 3600/300,000 \approx 1/81$ feet, $= 43°$ of phase shift.

For the orthogonal antenna triad 4-2-5 (FIG. 2) with $B = 60$ ft. at 10,000 MHz, the phase difference corresponding to 50 nautical miles would be 0°, since $\theta = 90°$.

If the emitter E were located 50 nautical miles from the interferometer but off boresight by 30° (angle $\alpha$ equal to 30°) the $\pm B \sin\alpha$ terms [equations (3) and (4)] are: (18) $\pm 60 \sin\alpha = \pm 30$ feet respectively. At the X band, each of these distances would correspond to a phase angle of 300 wave lengths or 108,000 electrical degrees (360° times 300); being of opposite sign however, they would cancel when added.

The sum of the curvature terms D (equation (17) would now be $$D = B^2/R [1 - (0.5)^2] = 0.75 \ B^2/R. \quad (19)$$

The curvature phase shift corresponding to $B^2/R$ at 10,000 MHz for an off axis position of the emitter of 30° would therefore be reduced by 25% to approximately 32°:

$D = 0.75 \ B^2/R$ where $B^2/R$ 43° = 0.75 × 43° = 32°

For the orthogonal antenna triad (antennas 4-2-5) the angle off axis ($\theta$) is equal to 90 − $\alpha$ or 60°. The $\pm B \sin\theta$ terms for the 4-2-5 antenna triad are $\pm 60 \sin 60°$ 60 × 0.866 = ±52 (20)

This is equivalent to ±520 wave lengths at X band, or ±187,200 electrical degrees. The $\pm B \sin\theta$ terms cancel upon addition and the sum of the curvature terms is $B^2/R (1 - \sin^2\theta) = B^2/R \cos^2\theta = B^2/R \sin^2\alpha = B^2/R$
$(0.5)^2 = B^2/R \ 0.25 = B^2/R \sin^2 30° = 43° × 0.25 = 11°$
of phase shift.

(21)

When the representing 32° of curvature phase shift term from interferometer antenna triad 1-2-3 is added to the curvature phase shift from antenna triad 4-2-5, the result is the total phase shift of 43° representing the true distance R of the emitter to the antenna.

The above example shows that the method of implementing the interferometer system must be capable of cancelling the opposite and equal phase terms ($\pm B \sin\alpha$, $\pm B \sin\theta$) of thousands of electrical degrees, while separating and properly adding the range curvature phase terms [$B^2/R (1 - \sin^2\alpha)$, $B^2/R (1 - \sin^2\theta)$] for angles of 1° to 90° off the antenna's axes.

Figure 3:
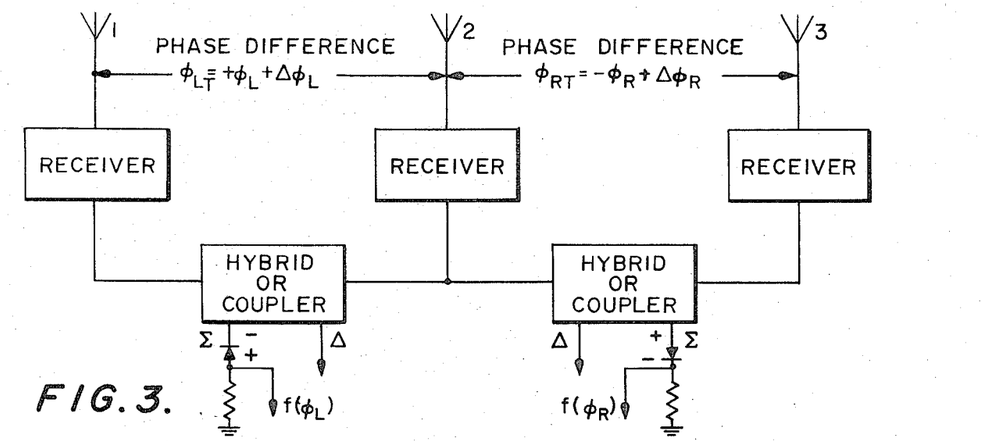
FIG. 3 shows a circuit in block form for developing the phase related signals and cancelling the equal and opposite phase related components.

Referring now to FIG. 3, a method of implementing the interferometer system of this invention is now described which utilizes conventional components and techniques to separate all wave front curvature phase difference terms from the large phase differences which occur due to the emitter angular deviation from the boresight of the antenna system. The implementation utilizes conventional hybrids and couplers to provide a D.C. analog voltage proportional to the phase shift caused by the radius of curvature path difference. This D.C. voltage is proportional to $B^2/R$.

FIG. 3 shows one of the orthogonal antenna triad systems comprising antennas 1-2-3. Each of the antennas has a receiver connected thereto which processes the signal. The output of the receiver for antenna 1 and antenna 2 is connected to the left hand hybrid (coupler) for measuring the phase shift difference $\phi_L$ between left hand antenna 1 and center antenna 2, and the output of receivers connected to antennas 2 and 3 are connected to the right hand hybrid (coupler) for measuring the phase difference $\phi_R$ between the right hand antenna 3 and center antenna 2.

The related phase difference angles $\phi_R$ and $\phi_L$ include equal and opposite components ($+\phi_L$ and $-\phi_R$) corresponding to the $\pm B \sin\alpha$ terms, and curvature components ($+\Delta\phi_L$ and $+\Delta\phi_R$) corresponding to the curvature terms. The output representing the range must be zero for the equal and opposite phase components and proportional to the sum of $\Delta\phi_L$ and $\Delta\phi_R$ phase components.

Figure 4A:
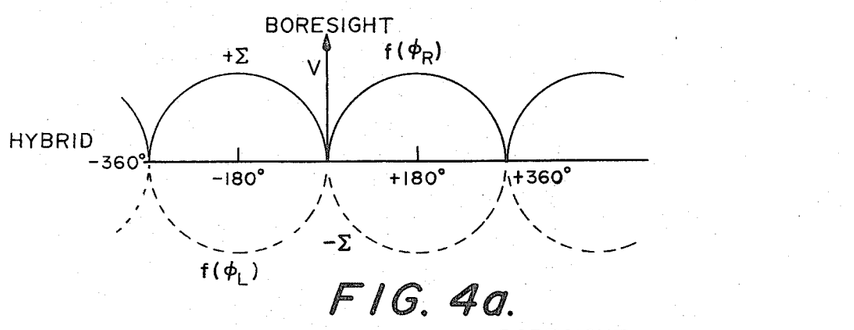
FIGS. 4a and 4b are the phase/voltage transfer characteristics for hybrids or couplers used in the schematic of FIG. 3.
Figure 4B:
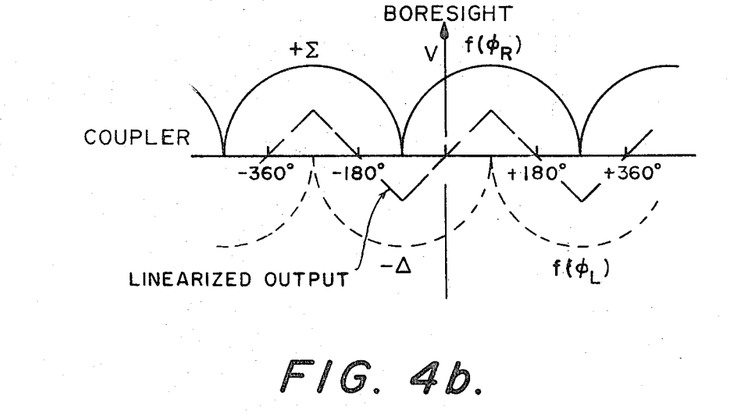

For the hybrids the signal components $f(\phi_R)$ and $f(\phi_L)$ are:
$f(\phi_R) = + \sin \phi_R/2 =$ [output from sum ($\Sigma$) channel]
$f(\phi_L) = - \sin \phi_L/2 =$ [− output from difference ($\Delta$) channel] and for the couplers, the signal omponents $f(\phi_R)$ and $f(\phi_L)$ $f(\phi_R) = + \sin [\phi_R + 90°/2] = [+ \Sigma \text{channel}]$ $f(\phi_L) = - \cos [\phi_L + 90°/2] = [- \Delta \text{ channel }]$ As shown in FIG. 4a and FIG. 4b, when the sum and difference ports of the hybrids or the sum and difference ports of the couplers are properly connected, the phase difference signals will total to zero for the equal and opposite phase components $\phi_L$ and $\phi_R$ corresponding to the $\pm B \sin\alpha$ terms and curvature terms will produce a signal proportional to the range R. The phase/voltage transfer characteristic shown in FIGS. 4a and 4b indicate the rectified output voltage from the hybrids or the couplers as a function of the phase difference between the center antenna 2 and each of the corresponding end antennas 1 and 3. The characteristics are sine and cosine functions of one-half the phase angle and the coupler outputs are 90° out of phase with respect to the hybrid outputs. The outputs of the difference ($\Delta$) ports are 180° out of phase with the sum ($\Sigma$) port outputs. Either polarity of output voltages is available depending upon which way the rectifier diodes are connected. If the output polarity from a hybrid (coupler) from one pair of antennas is inverted and summed with the output from the other pair of antennas as is shown in FIGS. 3 and 4, equal phase shifts from antennas 1-2 and 2-3 will produce equal and opposite voltages ($+\phi_L$ and $-\phi_R$) which will cancel when added. This effectively cancels the $\pm B \sin\alpha$ terms regardless of the electrical length of the path difference. Unequal phase shift angles between the two pairs of antennas produce an output voltage which is the sum of the voltages out of the two hybrids or couplers.

Figure 5:
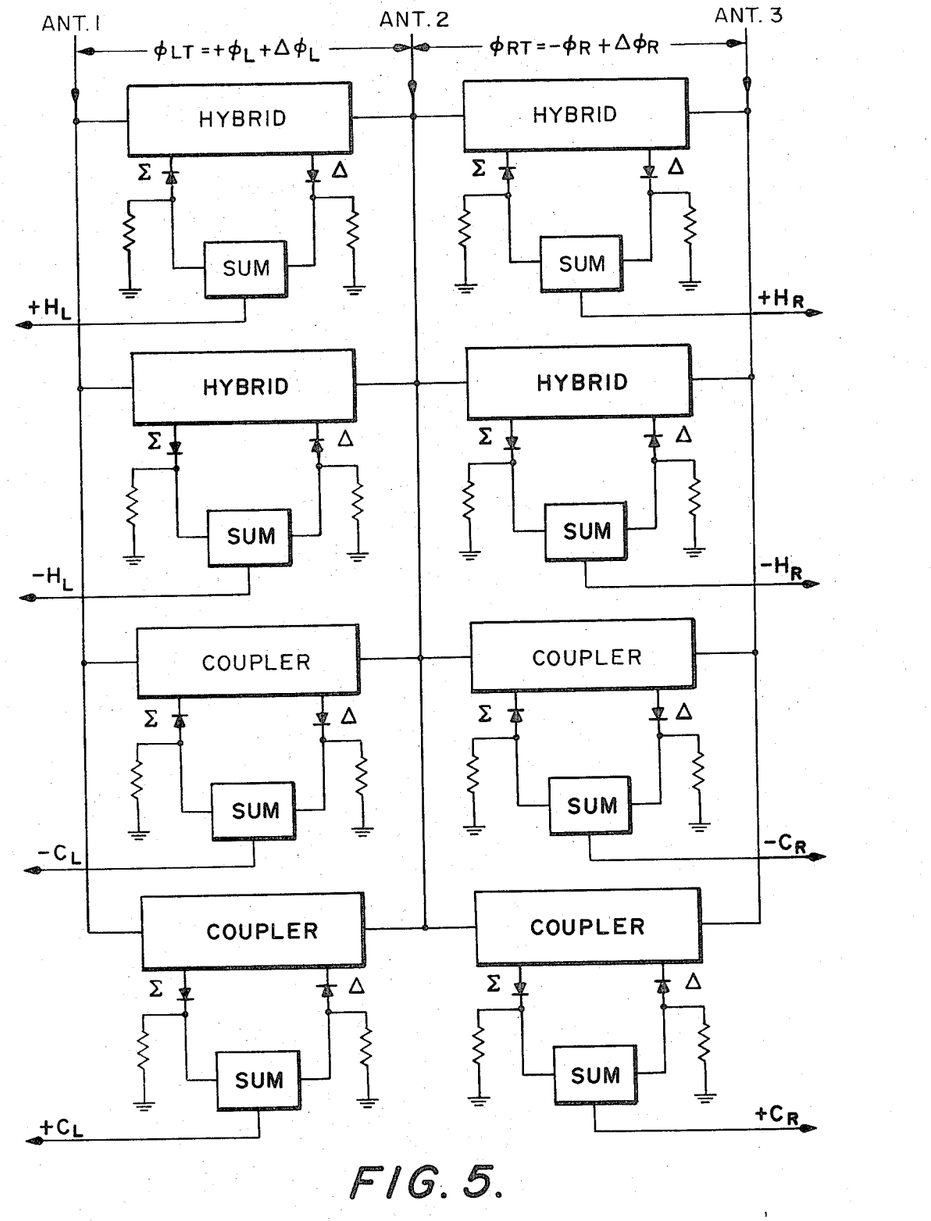
FIG. 5 is an expansion of FIG. 3 and shows the connection from each antenna pair to respective couplers and hybrids for developing the linear phase/voltage transfer characteristics of FIGS. 6a and 6b and of FIGS. 8a and 8b.

As shown in FIGS. 4a and 4b, the output voltages (V) with respect to the curvature phase shift term are not difficult to calibrate. The outputs may be linearized in relation to the curvature phase shift by separately summing the output from the sum and difference ports of the couplers (hybrids) from one antenna pair of a triad system before combining with the other antenna pair of the same triad system, as shown in FIG. 4B. The electrical interconnections for linearizing are as shown in FIG. 5.

Figure 6A:
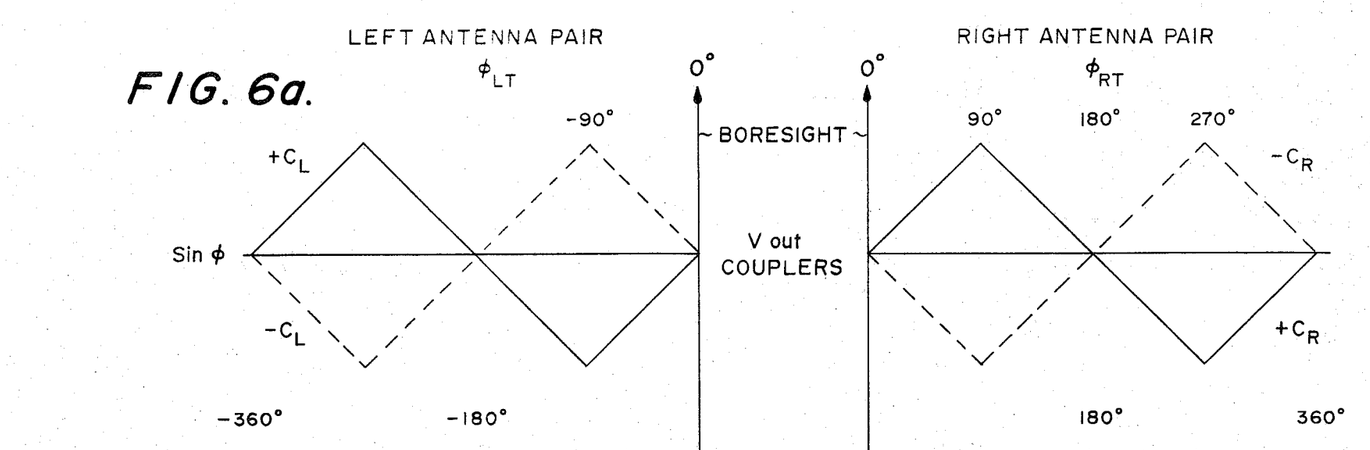
FIGS. 6a and 6b are the phase/voltage transfer characteristics of the outputs shown in FIG. 5 for each of the left and right hand antenna pairs.
Figure 6B:
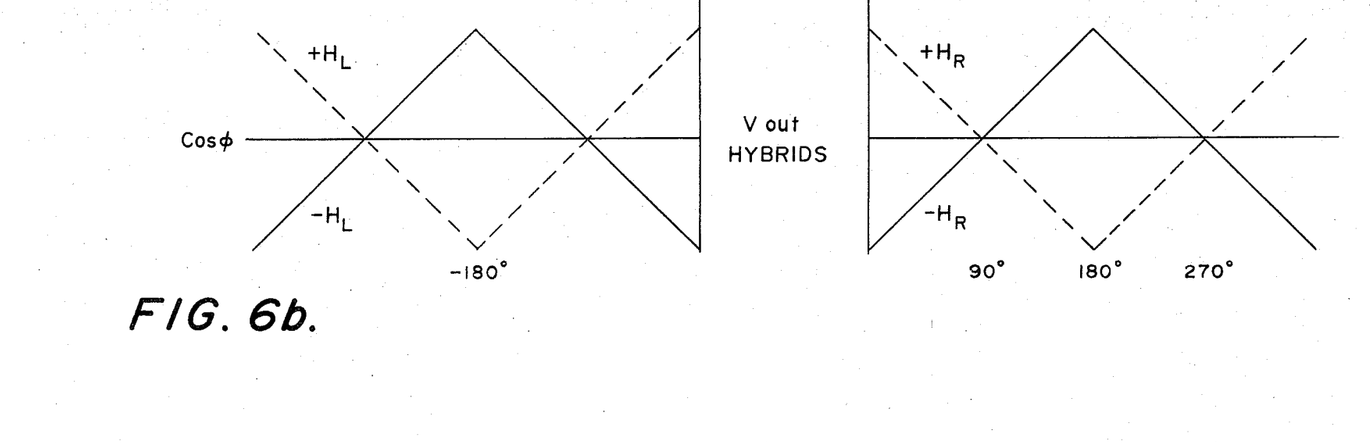

The linearly related output voltages from the four hybrids ($+H_R$, $-H_R$, $+H_L$, $-H_L$) and the four couplers ($+C_R$, $-C_R$, $+C_L$, $-C_L$) are as shown in FIG. 6.

By inverting and combining the sum and difference ports of the hybrid (coupler) connected to each pair of antennas, the linear bipolar phase/voltage transfer characteristics of FIGS. 6a and 6b are produced. In 6a, the coupler outputs are shown for the left and right hand pairs of antennas of a triad system and with the polarity of the output designated by the corresponding sign. The sum and difference ports of the hybrids and the couplers may be combined as shown in Table I to obtain the designated hybrid and coupler outputs (also shown in FIG. 5).

TABLE I

| Hybrids | | Couplers | |
|---|---|---|---|
| Sum | Output | Sum | Output |
| $\Sigma+$ to $\Delta-$ | $H-$ | $\Sigma+$ to $\Delta-$ | $C+$ |
| $\Delta+$ to $\Sigma-$ | $H+$ | $\Delta+$ to $\Sigma-$ | $C-$ |

The phase voltage relationship shown in FIGS. 6a and 6b for hybrids and couplers is linear over 360° corresponding to one wave length of approximately 0.1 feet at X band frequencies.

By utilizing a pair of hybrids and a pair of couplers for each pair of antennas, separate $+H$, $-H$, $-C$, and $+C$ outputs may be produced for each pair of antennas shown in FIG. 5. For a single triad system comprising antenna pairs 1-2 and 2-3, $+H$, $-H$, $-C$, and $+C$ outputs are produced for antenna pair 1-2 and separate $+H$, $-H$, $-C$, and $+C$ outputs are produced for antenna pair 2-3. Similarly, hybrid and coupler outputs are produced for each of the antenna pairs in antenna triad system 4-2-5. Each antenna pair will produce phase/voltage transfer characteristics as shown in FIGS. 6a and 6b as the target emitter is rotated to the right or the left of the boresight. An emitter angle to the right of the boresight will produce electrical angles increasing towards the right for the right hand antenna and electrical angles increasing towards the left for the left hand antenna pair. This occurs because the range to the right hand antenna becomes shorter than the range to the center antenna for the right hand pair and the range for the left hand antenna becomes longer than the range to the center antenna, advancing or retarding the input electrical phase angle accordingly.

The relationship of the emitter angle $\alpha$ off the boresight to 360° (1 wave length) of electrical angle between the phase related signals produced in an antenna pair is $$\alpha = \sin^{-1}(1/B\lambda)$$

where $\alpha$ = physical angle of emitter off the boresight where $B\lambda$ = baseline length in wave lengths For a baseline length of 60 feet and a wave length of 0.1 feet, corresponding to a frequency of 10,000 MHz, $B\lambda = 600$ wave lengths and $\theta \approx 1/600$, 360° of electrical angle, equivalent to one wave length, corresponds to a physical angle $\alpha$ off the boresight of 1/600 radians or 0.1°. The 360° cycles shown on each side of the boresight in FIGS. 6a and 6b are repeated many times as the physical angle off the boresight ($\alpha$) is changed.

The specific method of this invention for producing an analog voltage proportional to the differential phase shift between two antennas and producing 0 volts for equal and opposite phase shift differences between the two antennas is explained with reference to FIG. 7. The phase/voltage transfer characteristic of FIG. 7 is shown as producing an output voltage directly proportional to input phase angle over the entire range of input phase angles with a positive output ($+V_R$) for advancing the phase angles ($+\phi$) at the right hand antenna pair and a negative voltage output ($-V_L$) for lagging phase angles ($-\phi$) at the left hand antenna pair, and with voltage $-V_{L1}$ being equal and opposite to voltage $+V_{R1}$, corresponding to equal and opposite phase shifts $-\phi_1$ and $+\phi_1$. These equal and opposite voltages cancel resulting in zero volts output.

$$V_R + (-V_L) = 0 \text{ volts}$$

Differential phase shifts such as that existing between lagging phase shift $-\phi_1$ at the left hand antenna pair and $+\phi_2$ and the right hand antenna pair produce unequal voltage outputs $-V_{L1}$ and $+V_{R2}$ respectively, yielding $\Delta V$ when added together $$[V_{R2} + (-V_{L1}) = \Delta V]$$

A phase to voltage conversion device as shown in the foregoing, would therefore produce an analog output voltage $\Delta V$ proportional to a phase difference $\Delta\lambda$ between two phase related signals and would produce 0 volts when the phase difference between the two phase related signals are equal and opposite.

As shown in FIGS. 6a and 6b, the phase to voltage relationship shows discontinuities when taken over 360° of electrical angle. When the differential phase shift occurs over one of the discontinuities, the analog output voltage resulting from the sum of the phase proportional voltages produced would be in error. Therefore, it is necessary to obtain a voltage output from another continuous slope segment and electrically substitute it for the discontinuous segment whenever the input differential phase angles straddle a discontinuity. To implement this segmented analog differential phase shifter, it is only necessary to provide intermediate segments with slopes equal to the original segment slopes and include a threshold device to switch to the new slopes whenever the input phase angle occurs over two of the discontinuous segmented zones.

Figure 8A:
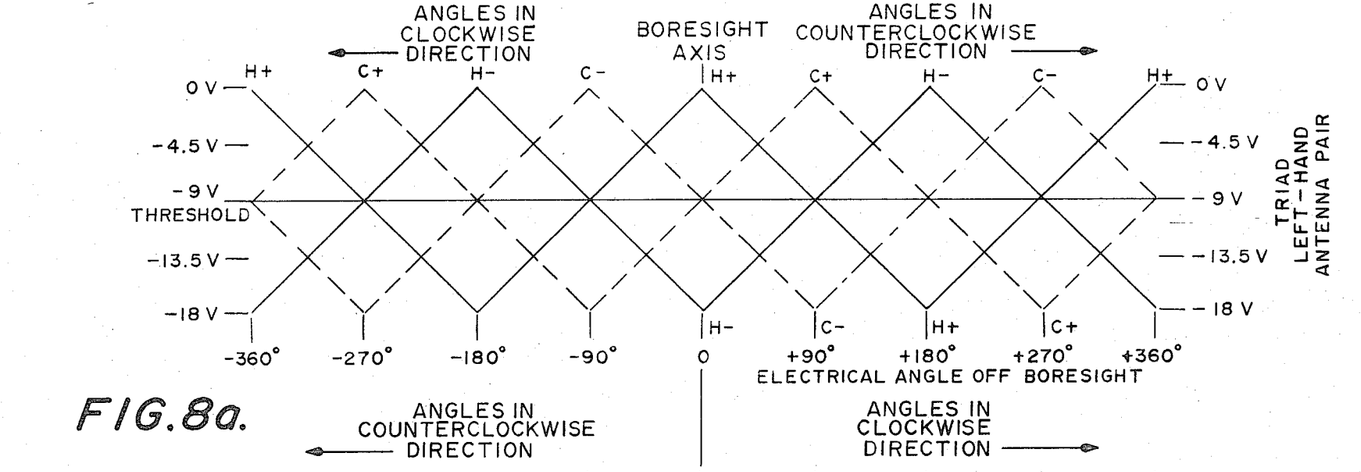
FIGS. 8a and 8b show the phase/voltage transfer characteristic of each pair of antennas of a triad, for counter-clockwise and clockwise emitter rotations from 0° to 360° and from 0° to −360°.
Figure 8B:
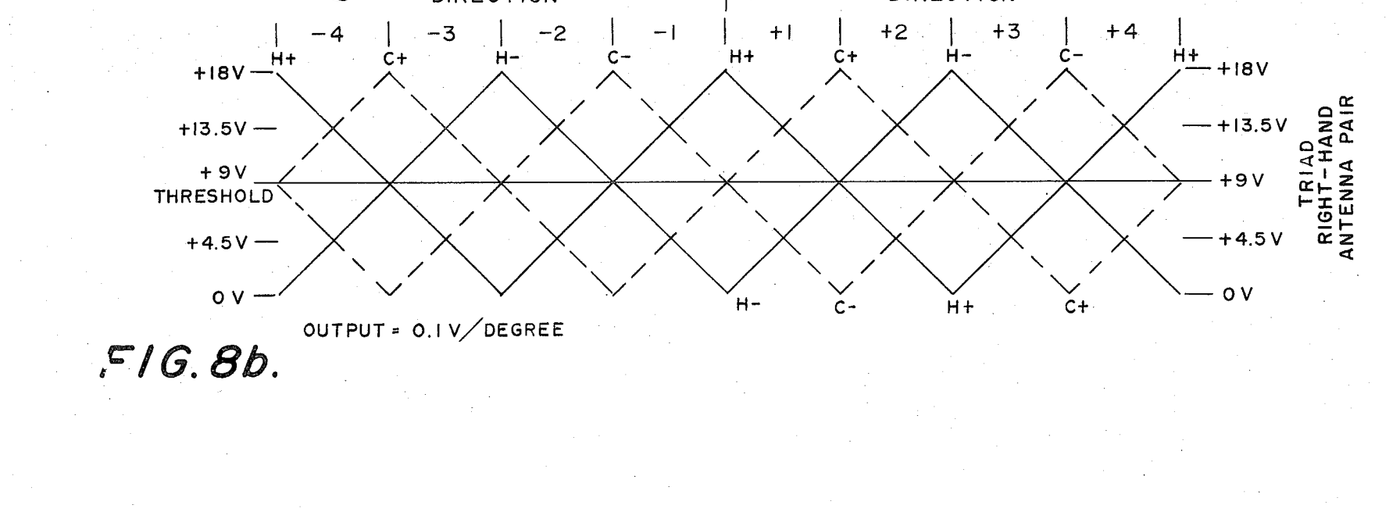

This segmenting is explained with reference to FIGS. 8a and 8b. FIG. 8a shows the $+H$, $-H$, $+C$, and $-C$ phase/voltage characteristics for the left hand antenna pairs of either orthogonal antenna triad systems. FIG. 8b shows the $+H$, $-H$, $+C$, and $-C$ phase/voltage output for right hand antenna pairs of either orthogonal triad systems. The voltage scales in FIG. 8a and FIG. 8b are shown as having a range of 0 volts to $-18$ volts for the left hand pairs and a range of 0 volts to $+18$ volts for the right hand pairs.

A voltage continuously proportional to phase differences is produced by summing the right hand +C to the left hand +C whenever the electrical phase angle off the boresight is contained within the ±90° range. Under these conditions the output voltage will vary from a sum of 0 volts (no phase differential) to a maximum of ±9 volts for a phase differential angle of ±90°.

When the phase differential angle is still within the maximum angle of 90° but is not contained on the +C slope of the left hand antenna pair and the +C slope of the right hand pair, the output must be obtained from the +H slope of the left hand antenna pair and the −H slope of the right hand antenna pair or other appropriate pairs so that the relationship between the left and right hand antenna pair voltage wave forms is continuous over the changing emitter angle.

Switching the phase detector voltage wave forms is accomplished by logic selection utilizing voltages exceeding prescribed thresholds to mark the angular boundaries of the regions desired. For example, in FIG. 8a, it may be noted that the output of the +C coupler of the left hand antenna pair exceeds the −9 volts threshold over the entire range of the desired +H slope in the range of 0 to −180° (and +180° to +360°). Similarly, the output of the +C coupler of the right hand antenna pair, FIG. 8b, exceeds +9V over the entire range of the desired −H slope in the range of 0 to +180 electrical degrees and −180° to −360°.

Figure 9:
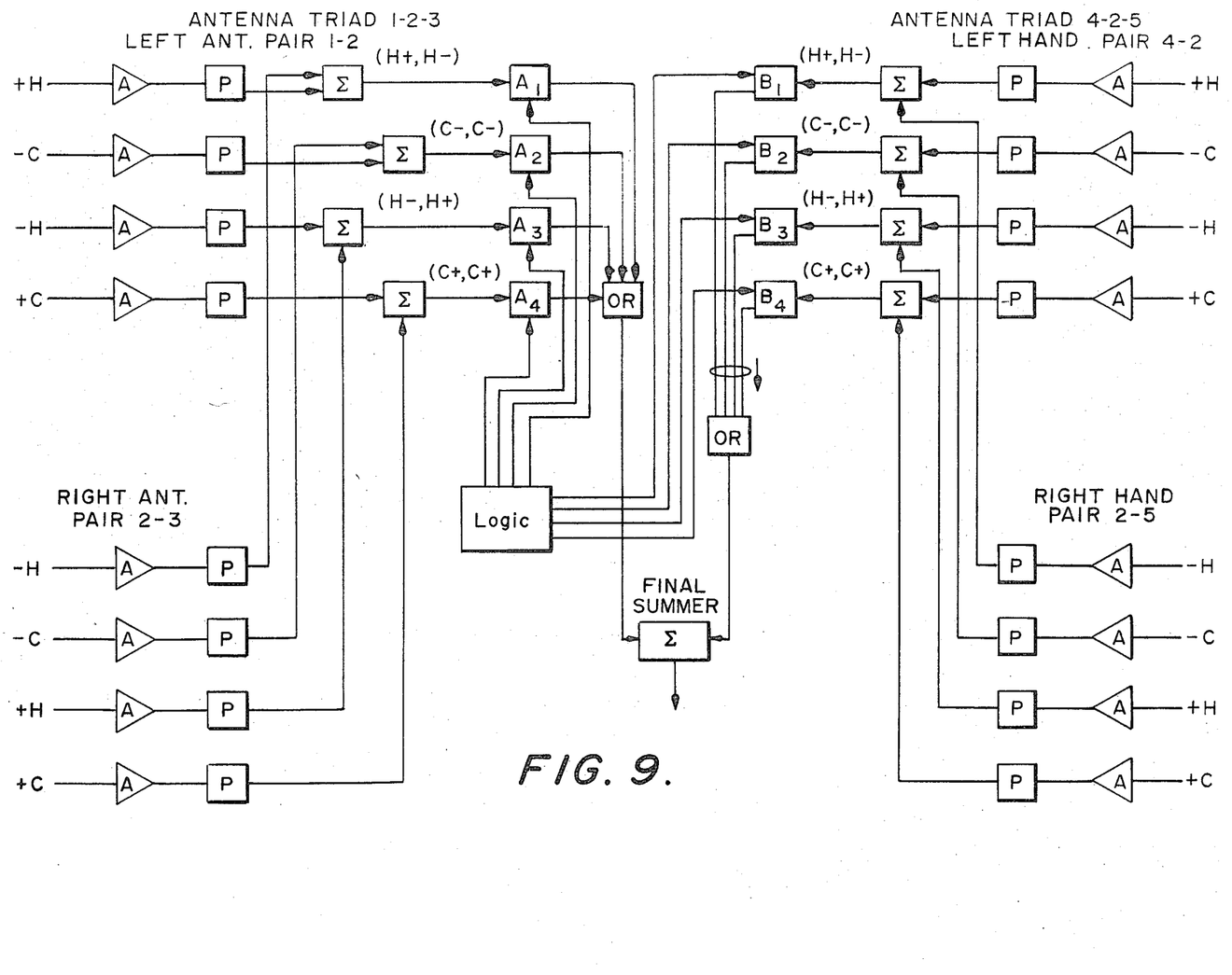
FIG. 9 shows in block form the complete schematic for processing the signals from each orthogonal antenna to produce the D.C. analog signal indicative of range.
Figure 10:
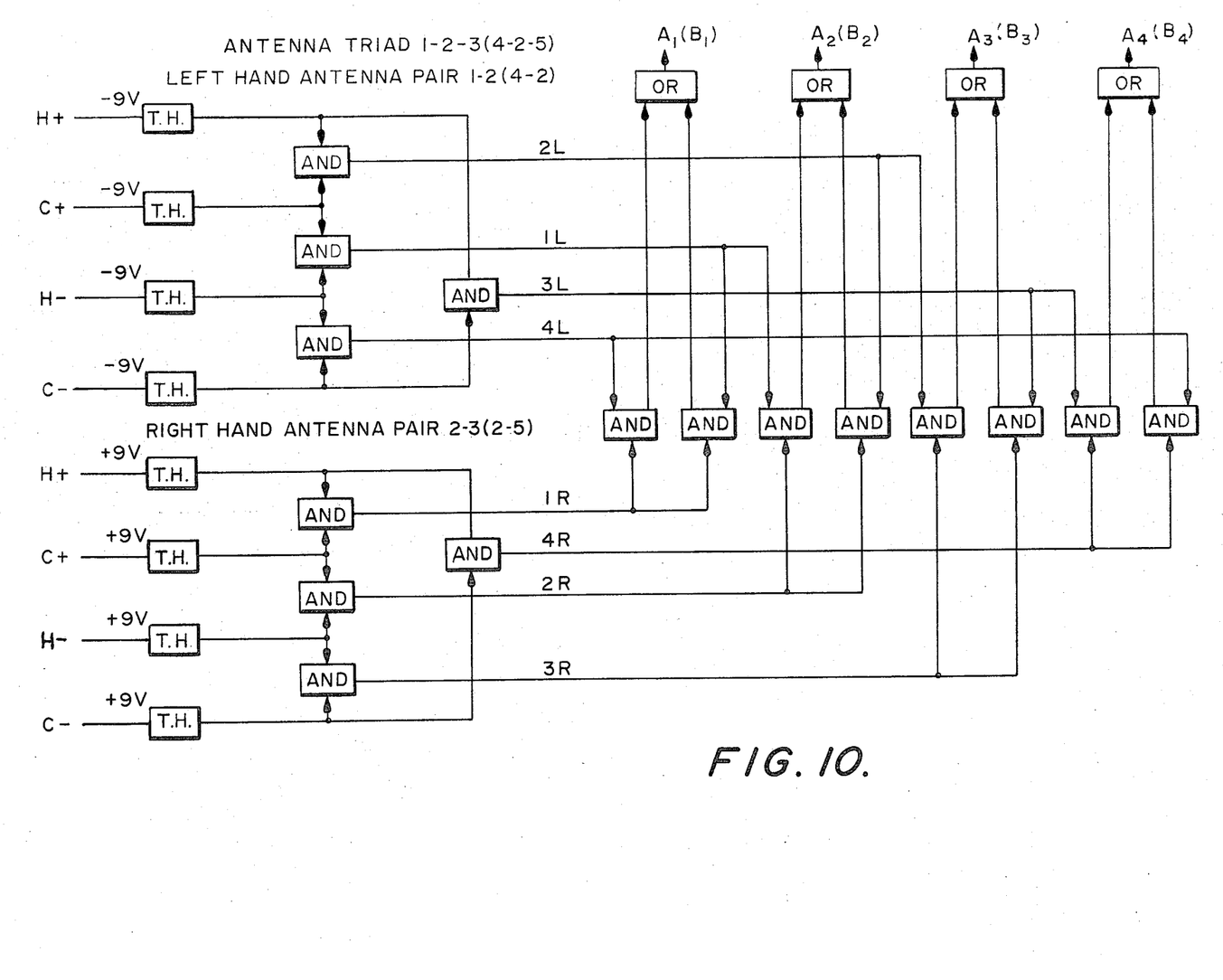
FIG. 10 shows in block form the logic system for selecting the appropriate combinations of hybrids and couplers to maintain a continuous phase/voltage transfer characteristic.

Implementation of the logic switching is now shown with reference to FIGS. 9 and 10. In FIG. 9 the system is shown having inputs from antenna triads 1-2-3 and antenna 4-2-5 with antenna number 2 being a common antenna for both traid systems. As shown on the upper left hand side of FIG. 9, the respective sum and difference ports of the hybrids and couplers connected to the left hand antenna pair 1-2 produces outputs +H, −C, −H, and +C. As shown in the lower left hand side, the hybrids and couplers connected to right hand antenna pair 2-3 are connected to produce outputs −H, −C, +H, and +C.

Similarly, orthogonal antenna triad systems 4-2-5 having a left hand antenna pair 4-2 with its hybrids and couplers connected to produce outputs +H, −C, −H, and +C and as shown in the lower right hand corner antenna pair 2-5 has its hybrids and couplers connected to produce outputs −H, −C, +H, and +C. The manner of connecting the hybrids and couplers to antenna pairs to produce the foregoing outputs is as shown in FIG. 5 and in Table I. Each hybrid and coupler output is amplified by an amplifier (designated A) shown in each channel. The amplified signal is then peak-detected, and stretched by peak-detector stretcher P, also shown in each channel (to handle pulse emitters).

The hybrid and coupler outputs are summed as shown to provide continuous analog phase to voltage conversion slopes over the angular range −360° to +360°, so that signals may be added from the left hand and right hand antenna pairs to effectively cancel voltages corresponding to equal and opposite phase angles.

As shown in FIG. 9, output +H from antenna pair 1-2 is summed with output −H from antenna pair 2-3; output −C from antenna pair 1-2 is summed with output −C from antenna pair 2-3; output −H from antenna pair 1-2 is summed with output +H of antenna pair 2-3; and, output +C of antenna pair 1-2 is summed with output +C of antenna pair 2-3. Similarly, in the orthogonal antenna triad system 4-2-5, output +H antenna pair 4-2 must be added to output −H of antenna pair 2-5; output −C of antenna pair 4-2 must be added to output −C of antenna pair 2-5; output −H of antenna pair 4-2 must be added to output +H of antenna pair 2-5 and output +C of antenna 4-2 must be added to output +C of antenna pair 2-5 so that signals from the left hand antenna pair added to the signals from the right hand antenna pair will result in voltages corresponding to equal and opposite phase difference angles, cancelling.

Each of the summer outputs is connected through a respective "and" gate ($A_1 - A_4$ and $B_1 - B_4$) to a final summer which sums the output signals of each of the orthogonal antenna triad systems to produce a voltage proportional to range R and independent of off angles $\alpha$ and $\theta$.

The logic system for controlling the signals passed by the respective "and" gates to the final summer is contained within the block marked LOGIC in FIG. 9. The logic actuates the respective "and" gates connected to each of the summers in the left and right hand antenna triad systems. The appropriate output is connected to the final summer by opening the appropriate "and" gate so the phase/voltage characteristics are maintained continuous. As explained before, as the emitter off boresight changes angle, the hybrids and couplers exhibit discontinuous phase/voltage characteristics and switching must be used to select the combination of hybrids and couplers and their respective phase/voltage slope characteristics to maintain a continuous system output. Referring to left and right hand antenna pairs, FIGS. 8a and 8b, it can be seen that a continuous relationship exists for a phase angle from 0° to 90°, where the +C, +C outputs are used. For 90° to 180° of electrical angle the +H, −H outputs for left and right hand antennas respectively are used, for 180° to 270° the −C, −C outputs are used, and for 270° to 360° the left hand −H and right hand +H outputs are used.

The system is implemented by using a +C output from the left hand pair of an antenna triad and +C from the right hand pair of the antenna triad over the range of 0° to ±90°. When the phase angle of the right hand pair exceeds 90°, the input to the final summer is switched to the +H output of the left hand pair and −H output of the right hand pair, covering 0° to ±180°. The continuity in phase/voltage characteristic is maintained over −360° to 0° to +360° of electrical angle by using the combinations of slopes shown in Table II for each of the phase shift quantities shown.

The last combinations of slopes in Table II is +C, +C for the special case of the emitter precisely on the boresight so that each of the antenna pairs has a phase lag between the signals at the outside antenna and the center reference antenna. The method for processing a signal in this condition will be explained below.

The location of the switching points and the symmetry of the coupler and hybrid outputs permits switching to be accomplished when an appropriate coupler or hybrid voltage Table II

| Left Hand Antenna Pair | | Right Hand Antenna Pair | |
| --- | --- | --- | --- |
| +C | 0° to −90° | +C | 0° to +90° |
| +H | 0° to −180° | −H | 0° to +180° |
| −C | −90° to −270° | −C | +90° to +270° |
| −H | −180° to −360° | +H | +180° to +360° |
| *+C | 0° to +90° | +C | 0° to +90° |

*for on boresight conditions crosses a threshold voltage midway between the maximum and minimum voltages of the couplers and hybrids outputs. As shown in FIG. 8a, this occurs when the voltage outputs from the couplers or hybrids exceeds −9 volts. In FIG. 8b, it occurs when the outputs exceed +9 volts. For example, the −C outputs on the right hand pair of FIG. 8b cross the 9 volt threshold at 180° and could be used to switch (+H, −H) combination to the (−C, −C) combination at the 180° slope discontinuity of the −H slope.

The logic table constructed from the combinations needed for switching to uniquely define the 90° sectors shown in FIGS. 8a and 8b is shown in Table III. For the left hand antenna, in the sector 0° to 90°, the −H hybrid output and the +C hybrid output both exceed −9 volts. In the right hand antenna pair, the 0° to 90° sector and the −270° to −360° sector is characterized by a +H output and a +C output exceeding +9 volts. The other combinations can be seen by inspection to coincide with the threshold quantities shown in FIGS. 8a and 8b. By inspection of Table III it can be seen that each quadrant is uniquely characterized by hybrid and/or coupler combinations having outputs above designated thresholds. The combinations are given the designations $1_L$ and $4_L$ for the left hand antenna pairs and $1_R$ and $4_R$ for the right hand antenna pairs. The logic combinations for selecting the appropriate hybrid/couplers are those listed in Table III. These combinations are selected as shown by identifying the 90° sectors occupied by a signal as it phase changes through an angle of 360° electrical degrees, and relating the sectors to the phase/voltage characteristics desired.

The voltage output of the final summer (FIG. 9) will be the algebraic sum of the outputs of the two orthogonal triad systems. If the logic is established correctly, the D.C. output voltage will remain constant representing an emitter at a constant range from the center of the orthogonal antenna triad system although the emitter may be rotated about the center within 360° of angle and at a constant radius equal to the constant range R.

A check of the switching is made by assuming a signal, at the range R, rotates counterclockwise through 360°. The result of this check is illustrated in Table IV which is similar to Table III and needs no further explanation. Table III and Table IV indicate that all of the logic is correct and the proper hybrid/couplers are being switched in response to the clockwise or counterclockwise rotation of the emitter about the boresight. Under these conditions, the signal output from the system remains at 6 volts showing that the emitter is at range R, although rotating about the antenna system counterclockwise. A similar result can be shown for clockwise rotation.

When the emitter is precisely on the boresight, each end antenna shows a phase shift in the same direction between each of the end antennas and the center reference antenna of the triad system and the phase shift difference in Table III is 30° of phase. Under these conditions, the logic selects the +C, +C combination and the voltage outputs add correctly to the 6 volt output, demonstrating that the interferometer system correctly identifies the range of the signal by producing a voltage proportional to its range when the emitter is on boresight.

The logic required to implement the logic tables shown

Table III

| Sector | FIG.8a | | FIG.8b | | Sector |
|---|---|---|---|---|---|
| | Left | | Right | | |
| 0° to −90° or +210° to +360° | −H > −9V<br>+C > −9V | $1_L$ | +H > +9V<br>+C > +9V | $1_R$ | 0° to +90° or −270° to −360° |
| −90° to −180° or +180° to +270° | +H > −9V<br>+C > −9V | $2_L$ | −H > +9V<br>+C > +9V | $2_R$ | +90° to +180° or −180° to −270° |
| −180° to −270° or +90° to +180° | +H > −9V<br>−C > −9V | $3_L$ | −H > +9V<br>−C > +9V | $3R$ | +180° to +270° or −90° to −180° |
| −270° to −360° or 0° to +90° | −H > −9V<br>−C > −9V | $4_L$ | +H > +9V<br>−C > +9V | $4_R$ | +270° to +360° or 0° to −90° |
| *0° to +90° | −H > −9V<br>−C > −9V | $4_L$ | +H > +9V<br>+C > +9V | $4_R$ | 0° to +90° |

*for on boresight condition

TABLE IV

Range Measurement vs Angular Rotation of an Emitter at Range R, Rotated Counterclockwise

| Electrical Phase Angle Degrees | | Signal Sectors | | Phase/Voltage Characteristics | Voltage Outputs | | |
|---|---|---|---|---|---|---|---|
| Left | Right | | | | L. | R. | Total |
| *+30 | +30 | $4_L$ | $1_R$ | +C, +C | −6, | +12 | +6 |
| +70 | −10 | $4_L$ | $4_R$ | −H, +H | −11, | +17 | +6 |
| +100 | −40 | $3_L$ | $4_R$ | −H, +H | −8, | +14 | +6 |
| +160 | −100 | $3_L$ | $3_R$ | −C, −C | −11, | +17 | +6 |
| +190 | −130 | $2_L$ | $3_R$ | −C, −C | −8, | +14 | +6 |
| +250 | −190 | $2_L$ | $2_R$ | +H, −H | −11, +17 | +6 | |

TABLE IV — Continued

Range Measurement vs Angular Rotation
of an Emitter at Range R, Rotated Counterclockwise

| Electrical Phase Angle Degrees | | Signal Sectors | | Phase/Voltage Characteristics | Voltage Outputs | | |
|---|---|---|---|---|---|---|---|
| Left | Right | | | | L. | R. | Total |
| +280 | −220 | $1_L$ | $2_R$ | +H, −H | −8, | +14 | +6 |
| +340 | −280 | $1_L$ | $1_R$ | +C, +C | −11, | +17 | +6 |
| +270 | −310 | $4_L$ | $1_R$ | +C, +C | −8, | +14 | +6 |

*on boresight condition wherein each of the 90° sectors are uniquely defined is shown in FIG. 10 and corresponds to a detailed description of the block marked LOGIC in FIG. 9. The "and" gates $A_1$ through $A_4$ are those shown in FIG. 9 for antenna triad 1-2-3, it being understood that the same logic shown in FIG. 10 is used for the orthogonal triad system 4-2-5 with gate $B_1$ substituted for gate $A_1$, gate $B_2$ substituted for gate $A_2$, gate $B_3$ substituted for gate $A_3$, and gate $B_4$ substituted for gate $A_4$, corresponding to substitution of the appropriate gates for the antenna triad 4-2-5 for the gates of antenna triad system 1-2-3.

It being understood that the concepts and principles described in this application apply equally well to wave propagation other than electromagnetic waves. An important example would be its use in underwater passive ranging for SONAR-type applications. At a frequency of 300 khz the wavelength in water is approximately 0.2 inches and the example given in the application would be exactly duplicated with a baseline length, B, of only 10 feet instead of the 60 feet used at the electromagnetic frequency of 10,000 MHz. The system could be conveniently modeled in a water tank at a frequency of 5 MHz., (wavelength equals approximately 0.01 inches) with an equivalent baseline length, B, of only 6 inches.

What is claimed is:

1. A passive ranging interferometer comprising:
an antenna array having elements in spaced relationship to each other;
said elements producing phase related signals in response to a wave received by said array from an emitter;
said phase related signals comprising equal and opposite phase components and a phase differential component;
means connected to said antenna to produce an analogue voltage proportional to said phase differential component and representative of the distance of an emitter from said antenna array, said means connected to said antenna including means for adding and cancelling said equal and opposite phase components; and
said analogue voltage being independent of said equal and opposite phase components;
said analogue voltage being constant for a constant emitter range from aid antenna array and independent of the angle of said emitter with respect to the boresight of said array.

2. The system of claim 1 wherein:
said elements in said array are arranged on orthogonal baselines;
said phase related signals produced by said elements on a first of said baselines being proportional to the boresight emitter off angle of said first baseline;
said phase related signals produced by said elements on a second of said baselines arranged orthogonally with respect to said first baseline being proportional to the complement of said boresight off angle; and
said means connected to said antenna including means to combine said phase related signals of said first and second baseline arranged elements to produce a signal independent of said boresight off angle.

3. The system of claim 2 wherein:
each of said baseline arranged elements includes a center element and end elements spaced apart from said center element; and
said means connected to said antenna to produce an analogue voltage including means connected to said baseline arranged elements to combine the signals produced in said end elements for producing signals having a component corresponding to the distances from each respective end element to a line representing the emitter signal wave front in plane wave form and components representing the distances from the assumed plane wave front to the emitter spherical signal wave front.

4. The system of claim 3 wherein:
said equal and opposite phase related components being the components representing the distances from respective end elements perpendicular to the assumed plane wave front and defined by a line from each said respective end element to the respective perpendicular point of intersection with said plane wave front, said differential phase related components representing the distances between the assumed plane wave front and the curved wave front defined by lines from said respective perpendicular intersections and passing through said curve wave front.

5. The system of claim 4 wherein:
said means connected to said antenna to produce said analog voltage has a linear and continuous phase/voltage transfer characteristic.

6. The system of claim 5 wherein:
each of said baseline arranged elements form a right hand and a left hand antenna pair of elements for each baseline;
said means connected to said antenna producing +H, −H, +C, and −C outputs for each of said pairs; and said means connected to said antenna including means to combine one of the said outputs from said right hand pair with one of the said outputs from said left hand pair, maintaining said continuous phase/voltage transfer characteristic over 0° to 360° and 0° to −360° of electrical angle.

7. The system of claim 6 wherein:

said means for combining said outputs including summers connected to sum the following left and right hand outputs of baseline arranged elements,

| Left Hand Pair Output | Summed With | Right Hand Pair Output |
|---|---|---|
| +H | + | −H |
| −C | + | −C |
| −H | + | +H |
| +C | + | +C |

8. The system of claim 7 wherein:

said means for combining includes a plurality of AND gates with each of said summer outputs being connected to the input of a respective AND gate;

logic means connected to said right and left hand outputs and responsive thereto for sensing the electrical phase angle for each of said baseline arranged right and left hand pairs and selecting the appropriate pair of left and right hand outputs for maintaining the phase/voltage transfer characteristic continuous.

9. The system of claim 8 wherein:

said logic means includes threshold devices connected to respective left and right hand outputs;

said right and left hand outputs being voltage outputs symmetrical with respect to a voltage midpoint in the respective output phase/voltage transfer characteristic;

said threshold devices being arranged to generate a signal when each of said thresholds respective voltage output exceeds its voltage midpoint; and a plurality of AND gates connected to said threshold devices AND responsive to said and gates connected to said summer outputs.

10. The system of claim 9 wherein:

said threshold devices producing unique combinations of signals in response to said left and right hand outputs, for identifying the electrical phase angle of the left and right hand outputs;

said AND gates connected to said threshold devices selecting the outputs of said AND gates connected to said summers for maintaining said phase/voltage transfer characteristic continuous.

11. The system of claim 10 wherein:

said AND gates select the following summers and respective left and right hand outputs for each of the following phase angles, for maintaining said phase/voltage transfer characteristic continuous;

| Angle | Left Hand Antenna Pair | Right Hand Antenna Pair | Angle |
|---|---|---|---|
| 0° to −90° | +C | +C | 0° to +90° |
| 0° to −180 | +H | −H | 0° to +180° |
| −90° to −270° | −C | −C | +90° to +270° |
| −180° to −360° | −H | +H | +180° to +360° |
| *0° to +90° | +C | +C | 0° to +90° |

*for on boresight condition.

* * * * *